US012792687B2

(12) United States Patent
Terashima et al.

(10) Patent No.: US 12,792,687 B2
(45) Date of Patent: Nov. 10, 2026

(54) SEMICONDUCTOR DEVICE FOR PROCESSING OF IMAGE DATA IN NEURAL NETWORK

(71) Applicant: RENESAS ELECTRONICS CORPORATION, Tokyo (JP)

(72) Inventors: Kazuaki Terashima, Tokyo (JP); Isao Nagayoshi, Tokyo (JP); Atsushi Nakamura, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 1122 days.

(21) Appl. No.: 17/345,368

(22) Filed: Jun. 11, 2021

(65) Prior Publication Data

US 2022/0398441 A1 Dec. 15, 2022

(51) Int. Cl.
*G06F 17/15* (2006.01)
*G06F 7/544* (2006.01)
(Continued)

(52) U.S. Cl.
CPC ............ *G06F 17/15* (2013.01); *G06F 7/5443* (2013.01); *G06F 13/20* (2013.01); *G06F 13/28* (2013.01); *G06F 2213/28* (2013.01)

(58) Field of Classification Search
CPC ........ G06F 13/28; G06F 17/15; G06F 7/5443; G06F 3/04
See application file for complete search history.

(56) References Cited

U.S. PATENT DOCUMENTS 11,537,853 B1 * 12/2022 Afzal ...................... G06F 17/16
11,551,065 B2 1/2023 Martin
(Continued)

FOREIGN PATENT DOCUMENTS

CN 110020716 A 7/2019
CN 112016665 A 12/2020
(Continued)

OTHER PUBLICATIONS

An et. al., "An Ultra-Low-Power Image Signal Processor for Hierarchical Image Recognition With Deep Neural Networks", IEEE Journal of Solid-State Circuits, vol. 56, No. 4. Apr. 2021. (Year: 2021).*

(Continued)

*Primary Examiner* — Andrew Caldwell
(74) *Attorney, Agent, or Firm* — Rimon P.C.

(57) ABSTRACT

A semiconductor device executes the processing of a neural network. The memory MEM1 holds a plurality of pixel values and j compressed weighting factors. The decompressor DCMP restores the j compressed weighting factors to the uncompressed k (k≥j) weighting factors. The DMA controller DMAC1 reads the j compressed weighting factors from the memory MEM1 and transfers them to the decompressor DCMP. The n (n>k) accumulators in the accumulator unit ACCU multiply a plurality of pixel values and k uncompressed weighting factor to accumulate and add the multiplication results to the time series. A switch circuit SW1 provided between the decompressor DCMP and the accumulator unit ACCU transfers the k uncompressed weighting factors restored by the decompressor DCMP to n accumulators based on the correspondence represented by the identifier.

10 Claims, 12 Drawing Sheets

(51) Int. Cl.
*G06F 13/20* (2006.01)
*G06F 13/28* (2006.01)

(56) References Cited

U.S. PATENT DOCUMENTS

| | | | | |
|---|---|---|---|---|
| 11,574,171 | B2 | 2/2023 | Martin | |
| 11,960,421 | B2 * | 4/2024 | Liu | H03M 7/3059 |
| 12,353,343 | B2 | 7/2025 | Fujii et al. | |
| 12,511,544 | B1 * | 12/2025 | Xu | G06F 13/28 |
| 2018/0129935 | A1 * | 5/2018 | Kim | G06F 17/153 |
| 2019/0065947 | A1 | 2/2019 | Nakamura et al. | |
| 2019/0147327 | A1 * | 5/2019 | Martin | G06N 3/048 |
| 2019/0340488 | A1 * | 11/2019 | Fishel | G06N 3/063 |
| 2021/0042617 | A1 * | 2/2021 | Chinya | G06N 3/048 |
| 2021/0117352 | A1 * | 4/2021 | Fujii | G06F 15/80 |
| 2022/0121551 | A1 * | 4/2022 | Wang | G06N 3/045 |
| 2022/0318604 | A1 * | 10/2022 | Xu | G06N 3/04 |

FOREIGN PATENT DOCUMENTS

| | | | | |
|---|---|---|---|---|
| CN | 112667559 | A | 4/2021 | |
| EP | 3901832 | A1 * | 10/2021 | G06N 3/045 |
| GB | 2568102 | A * | 5/2019 | G06N 3/048 |
| JP | 2019-040403 | A | 3/2019 | |
| WO | WO-2017129325 | A1 * | 8/2017 | G06N 3/063 |

OTHER PUBLICATIONS

Extended European Search Report issued in corresponding European Patent Application No. 22176700.7-1203, dated Oct. 28, 2022.

Office Action issued on Oct. 18, 2025 in the corresponding Chinese patent application No. 202210560668.6, w/ English Translation.

Office Action dated May 14, 2026, issued in corresponding Chinese Application No. 202210560668.6.

* cited by examiner

SEMICONDUCTOR DEVICE FOR PROCESSING OF IMAGE DATA IN NEURAL NETWORK

BACKGROUND

The present invention relates to a semiconductor device, for example, to a semiconductor device for performing the processing of a neural network.

There are disclosed techniques listed below.

[Patent Document 1] Japanese Unexamined Patent Application Publication No. 2019-40403

Patent Document 1 discloses an image recognizing device having a convolution calculation processing circuit for performing an operation using an integration coefficient table in order to reduce the calculation amount of the convolution operation in the CNN (Convolutional Neural Network). The integration coefficient table holds data of N×N, and each of the data of N×N is composed of coefficients and channel numbers. Convolution arithmetic processing circuit includes a product calculation circuit for executing the product operation of N×N of the input image and the coefficient in parallel, performs cumulative addition operation for each channel number with respect to the product operation result, and a channel selection circuit for storing the addition operation result in the output register for each channel number.

SUMMARY

For example, in the processing of a neural network such as CNN, when transferring the image data and the weighting factor data stored in the memory to a plurality of accumulators, it is desirable to use a DMA (Direct Memory Access) controller for high speed. On the other hand, in particular, the data amount of the weighting factor data may be very large. Therefore, a method is conceivable in which the weighting factor data that is previously compressed on the memory is stored, and it is restored to the uncompressed weighting factor data by a decompressor and then transferred to a plurality of accumulators.

In this case, as a method of placing the decompressor, a method of placing between the memory and the DMA controller, or a method of placing between the DMA controller and the plurality of accumulators are considered. In the former method, there was a fear that the plurality of accumulators could not be effectively utilized sufficiently. In the latter method, since it is necessary to provide the compressor for each of the plurality of accumulators, there is a possibility that an increase in circuit area and power consumption occurs.

Other objects and novel features will become apparent from the description: of this specification and the accompanying drawings.

Therefore, semiconductor device of an embodiment is for performing the processing of the neural network, and has one or more memories, a decompressing unit, a first DMA controller, an accumulator unit, and a first switch circuit. The one or more memories hold a plurality of pixel values and j compressed weighting factors. The decompressor restores the j compressed weighting factors to the k (k≥j) uncompressed weighting factors. The first DMA controller reads the j compressed weighting factors from the memories and transfers them to the decompressor. The accumulator unit has n (n>k) accumulators multiply a plurality of pixel values and k uncompressed weighting factors, and add cumulatively the multiplied results to the time series. A first switch circuit provided between the decompressor and the accumulator unit transfers the k uncompressed weighting factors restored by the decompressor to n accumulators based on the correspondence represented by the first identifier.

By using semiconductor device of an embodiment, reduce of the circuit area can be realized.

DETAILED DESCRIPTION

Figure 1:
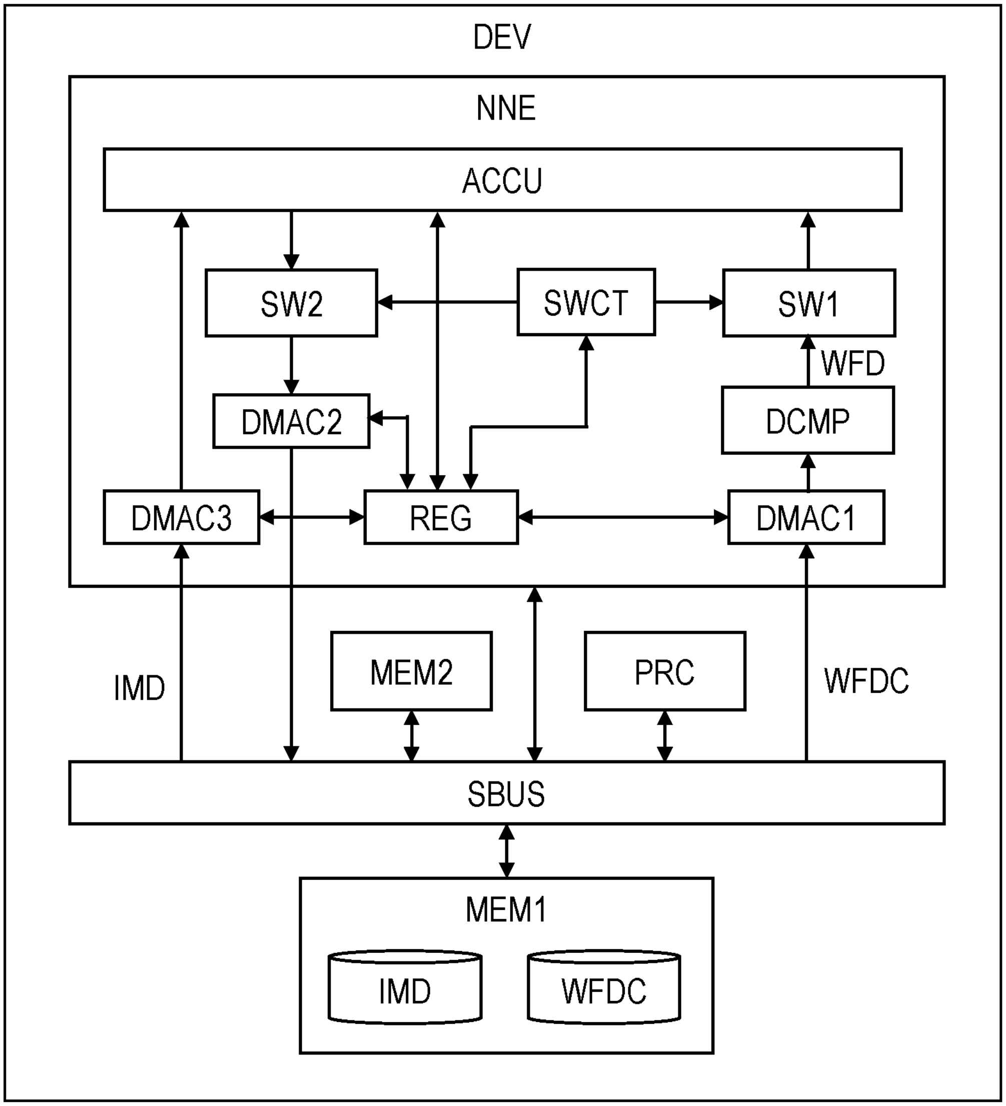
FIG. 1 is a schematic diagram showing a configuration example of a main part of a semiconductor device according to first embodiment of the present invention.

In the following embodiments, when required for convenience, the description will be made by dividing into a plurality of sections or embodiments, but except when specifically stated, they are not independent of each other, and one is related to the modified example, detail, supplementary description, or the like of part or all of the other. In the following embodiments, the number of elements, etc. (including the number of elements, numerical values, quantities, ranges, etc.) is not limited to the specific number, but may be not less than or equal to the specific number, except for cases where the number is specifically indicated and is clearly limited to the specific number in principle. Furthermore, in the following embodiments, it is needless to say that the constituent elements (including element steps and the like) are not necessarily essential except in the case where they are specifically specified and the case where they are considered to be obviously essential in principle. Similarly, in the following embodiments, when referring to the shapes, positional relationships, and the like of components and the like, it is assumed that the shapes and the like are substantially approximate to or similar to the shapes and the like, except for the case in which they are specifically specified and the case in which they are considered to be obvious in principle, and the like. The same applies to the above numerical values and ranges.

In all the drawings for explaining the embodiments, members having the same functions are denoted by the same reference numerals, and repetitive descriptions thereof are omitted. In the following embodiments, descriptions of the same or similar parts will not be repeated in principle except when particularly necessary.

First Embodiment

Schematic of Semiconductor Equipment

FIG. 1 is a schematic diagram showing a configuration example of a main part of a semiconductor device according to first embodiment of the present invention. A semiconductor device DEV shown in FIG. 1 is, for example, SoC (System on Chip) composed of one semiconductor chip or the like. Such the semiconductor device DEV is typically mounted on the ECU (Electronic Control Unit) or the like of vehicles to provide the functions of ADAS(Advanced Driver Assistance System).

The semiconductor device DEV shown in FIG. 1 has a neural network engine NNE, a processor PRC, such as a CPU (Central Processing Unit), one or more memories MEM1 and MEM2, and a system bus SBUS. The neural network engine NNE executes the processing of the neural network represented by CNN. The memory MEM1 is DRAM(Dynamic Random Access Memory), or the like, and the memory MEM2 is an SRAM(Static Random Access Memory) for caching or the like. The system bus SBUS connects the neural network engine NNE, the memory MEM1,MEM2, and the processor PRC to each other.

The memory MEM1 holds the image data IMD including a plurality of pixel values and the compressed weight factor data WFDC. Here, the amount of data in the weighting factor data may be very large. Therefore, the uncompressed weighting factor data WFD is stored in the memory MEM1 after being converted into a weighting factor data WFDC which is compressed in advance using a compression software or the like. The memory MEM2 is used as a high-speed cache memory for the neural network engine NNE. For example, the image data IMD in the memory MEM1 is previously copied to the memory MEM2.

The neural network engine NNE comprises a plurality of DMA controller DMAC1-DMAC3, a register REG, a decompressor DCMP, a plurality of switch circuit SW1 and SW2, a switch control circuit SWCT, and an accumulator unit ACCU. The DMA controller DMAC1 reads the compressed weighting factor data WFDC from the memory MEM1 and transfers it to the decompressor DCMP. The decompressor DCMP restores the compressed weighting factor data WFDC to uncompressed weighting factor data WFDS.

A switch circuit SW1 is provided between the decompressor DCMP and the accumulator unit ACCU. Although described later in detail, the switch circuit SW1, based on a predetermined correspondence, a plurality of weighting factors included in the uncompressed weighting factor data WFD restored by the decompressor DCMP, in the accumulator unit ACCU transferring to a plurality of accumulators. The DMA controller DMAC3 reads the image data IMD from the memory MEM2 and transfers it to the accumulator unit ACCU.

The accumulator unit ACCU includes a plurality of accumulators for executing a product-sum operation, and a product-sum operation and an uncompressed weighting factor data WFD from the image data IMD and the switch circuit SW1 from the DMA controller DMAC3. A switch circuit SW2 is provided between the accumulator unit ACCU and the DMA controller DMAC2. The switch circuit SW2 will be described later in detail, based on a predetermined correspondence, and transfers the output from the plurality of accumulators in the accumulator unit ACCU to a plurality of channels in the DMA controller DMAC2.

The switch control circuit SWCT, based on the setting data stored in the register REG, and controls the switch circuit SW1,SW2. Specifically, the switch control circuit SWCT controls the correspondence between the respective switch circuit SW1,SW2 described above. The register REG also stores setting data of the address range for the DMA controller DMAC1 to DMAC3, setting data for the accumulator unit ACCU, and the like.

Details of Neural Network Engine

Figure 2:
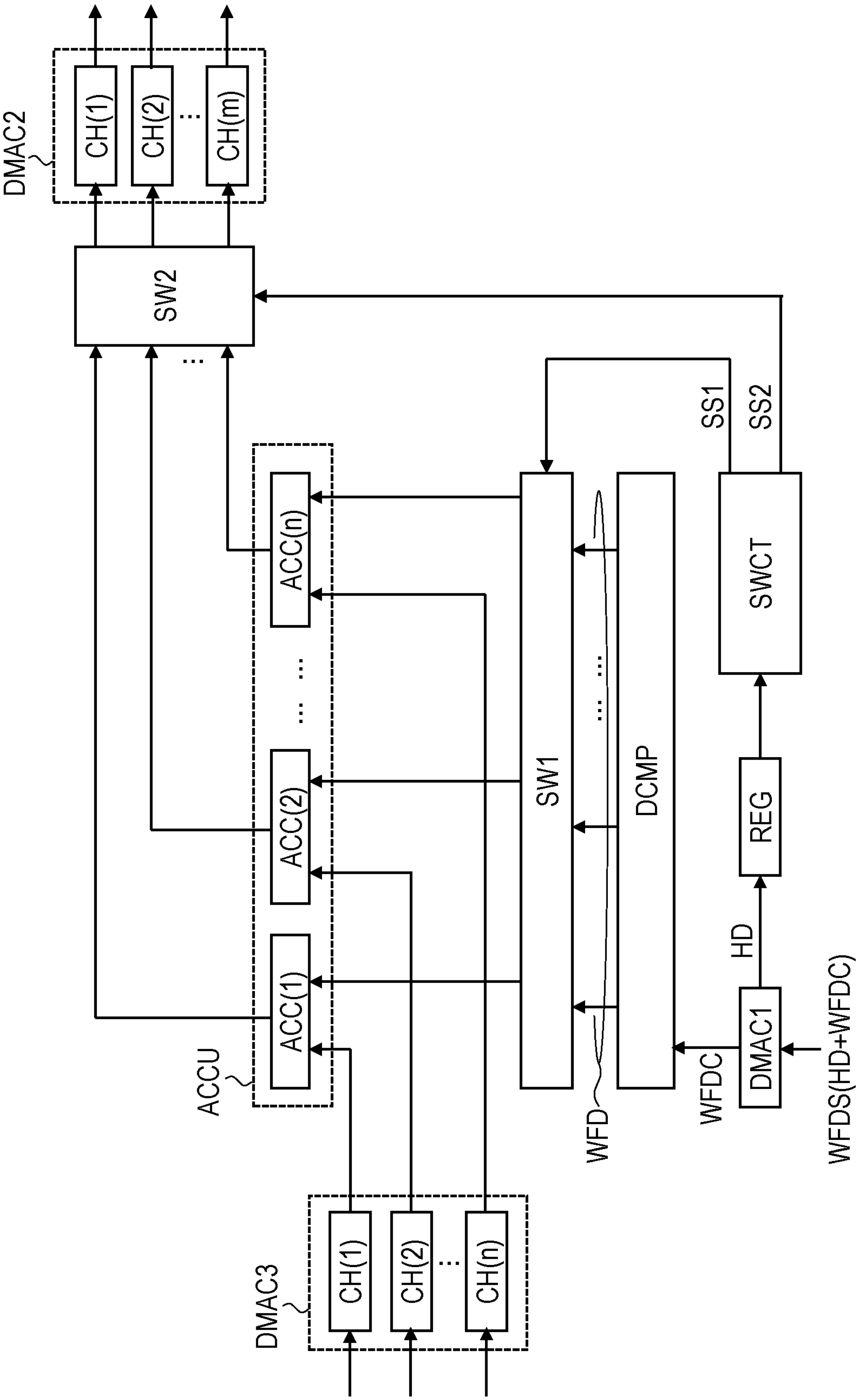
FIG. 2 is a diagram showing a detailed configuration example of a neural network engine in FIG. 1.
Figure 3:
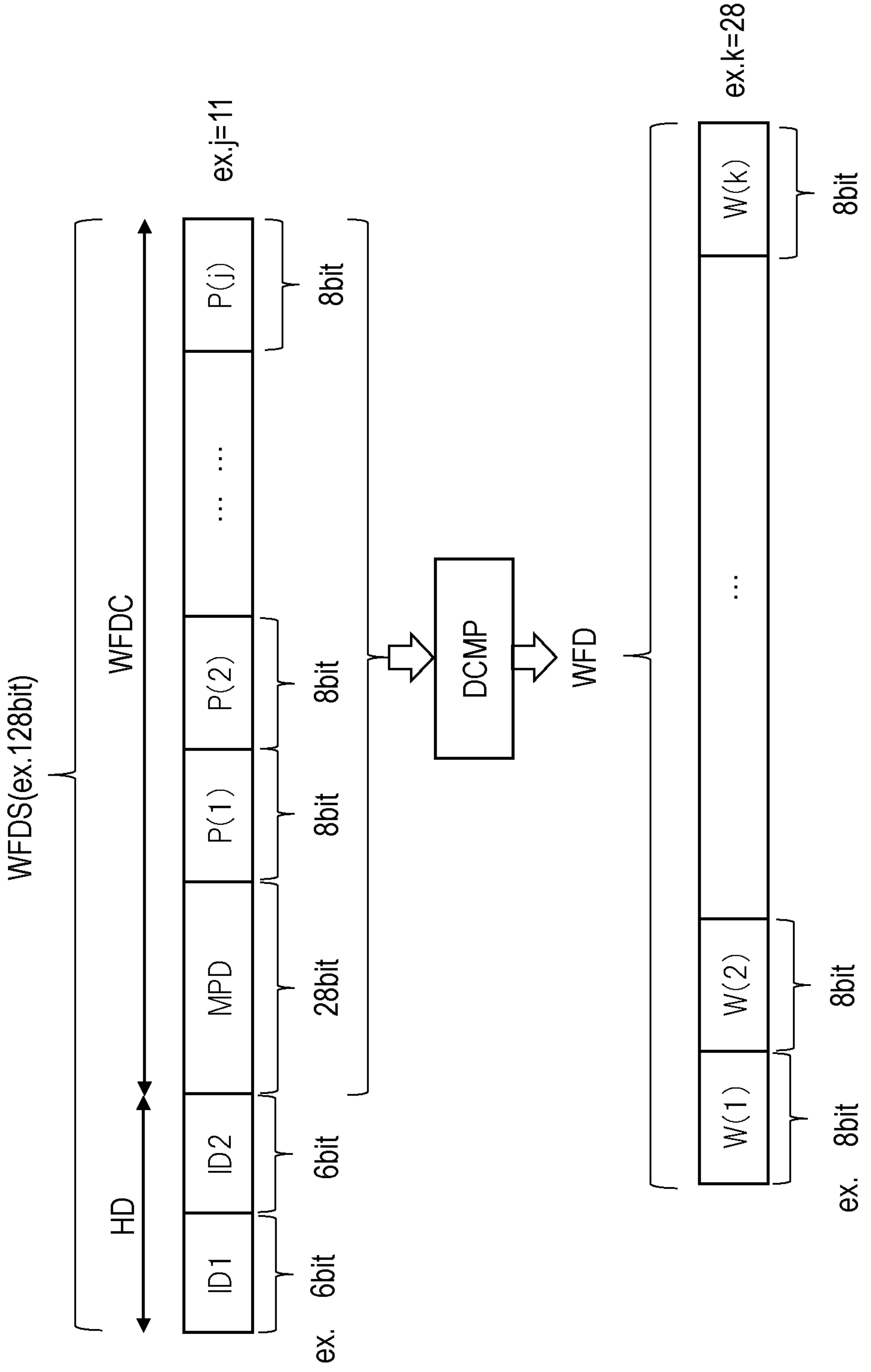
FIG. 3 is a diagram showing an operation example around the decompressor in FIG. 2.

FIG. 2 is a diagram showing a detailed configuration example of a neural network engine in FIG. 1. FIG. 3 is a diagram showing an operation example around the decompressor in FIG. 2.

Figure 4:
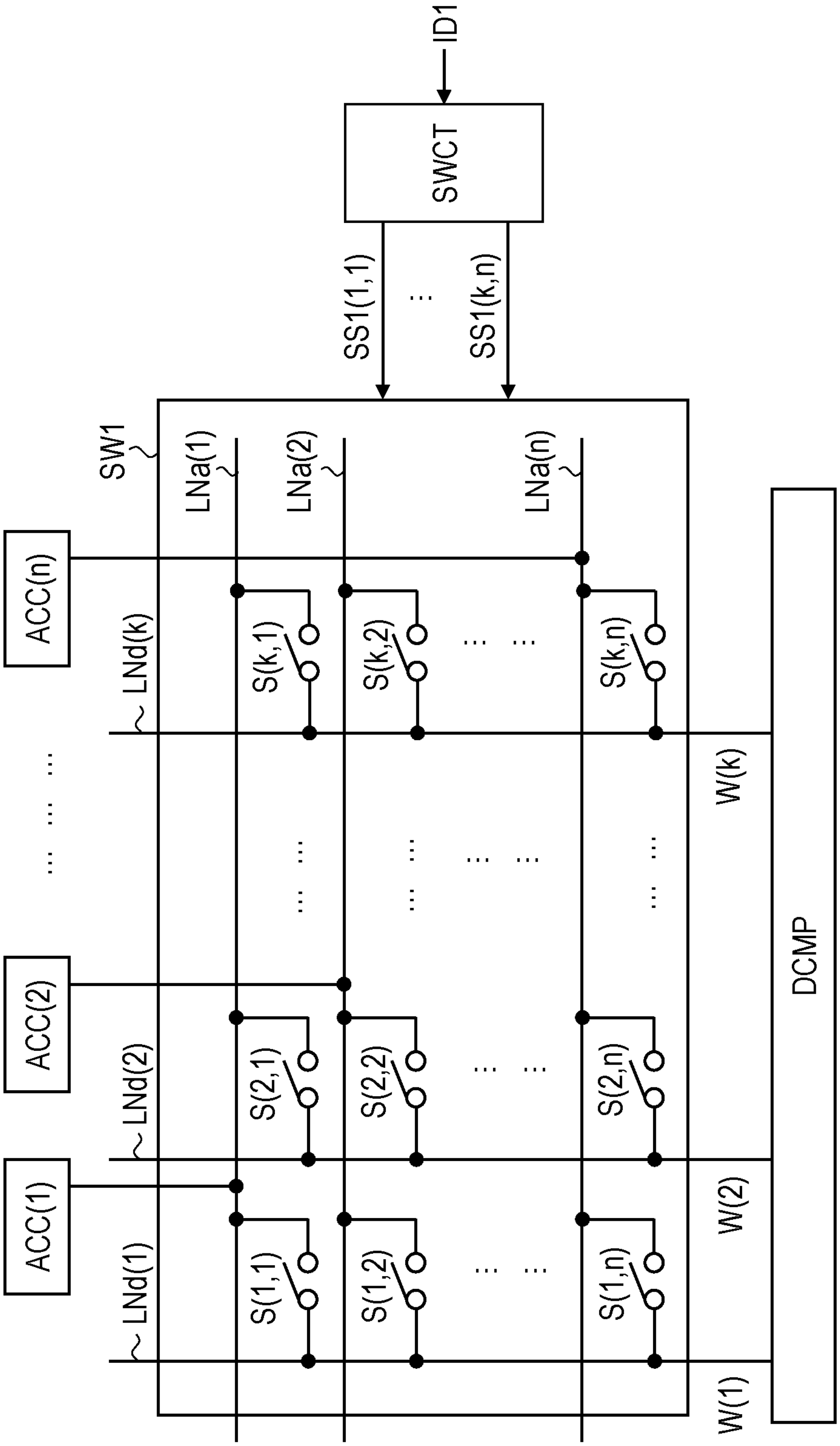
FIG. 4 is a diagram showing a configuration example around a switch circuit in FIG. 2.

FIG. 4 is a diagram showing a configuration example of a switch circuit around in FIG. 2. In FIG. 2, the DMA controller DMAC1 reads the weighting factor data set WFDS as shown in FIG. 3 from the memory MEM1 for each control cycle based on a preset read address range. That is, the memory MEM1 of FIG. 1 holds the weighting factor data set WFDS as shown in FIG. 3 in advance at each address of the read address range.

The weighting factor dataset WFDS shown in FIG. 3 includes a compressed weighting factor data WFDC and headers HD. The weighting factor data WFDC includes j compressed weighting factors P(1)-P(j) and map data MPDs. The header HD contains two Identifiers ID1 and ID2 that are uncompressed. As an example, each of the weighting factors P(1) to P(j) is composed of 8 bits, and "j" is 11. The map data MPD consists of 28 bits. Each of the two identifiers ID1 and ID2 consists of 6 bits. In this instance, the weighting factor dataset WFDS consists of 128 bits.

The DMA controller DMAC1 transfers the compressed weighting factor data WFDC contained in the weighting factor dataset WFDS, i.e., map data MPD and j compressed weighting factors P(1)-P(j), to the decompressor DCMP, as shown in FIGS. 2 and 3. Further, as shown in FIG. 2, the header HD, that is, the identifiers ID1 and ID2 included in the weighting factor data set WFDS is stored in the register REG.

The decompressor DCMP restores the compressed weighting factor data WFDC to uncompressed weighting factor data WFDS as shown in FIGS. 2 and 3. Specifically, the weighting factor data WFDC is, for example, a compressed data using a zero-run length method or the like. The decompressor DCMP restores the compressed j weighting factors P(1)-P(j) to the k (k≥j) uncompressed weighting factors W(1)-W(k) based on the location of the non-zero coefficients represented by the map data MPD. As an example, each of the weighting factors W(1)-W(k) is composed of 8 bits, and "k" is 28 or the like at most.

In FIG. 2, the switch control circuit SWCT, based on the header HD stored in the register REG, and controls the switch circuits SW1 and SW2. Specifically, the switch control circuit SWCT generates a switch control signal SS1 based on the identifier ID1 included in the weighting factor data set WFDS of FIG. 3, and controls the correspondence at the switch circuit SW1 using the switch control signal SS1. Similarly, the switch control circuit SWCT generates a switch control signal SS2 based on the identifier ID2 included in the weighting factor data set WFDS, and controls the correspondence at the switch circuit SW2 using the switch control signal SS2.

A switch circuit SW1 is provided between the decompressor DCMP and the n (n>k) accumulators ACC(1)-ACC(n) included in the accumulator unit, as shown in FIGS. 2 and 4. The switch circuit SW1, based on the switch control signal SS1, and thus the correspondence represented by the identifier ID1, and transfers the k uncompressed weighting factors W(1)-W(k) restored by the decompressor DCMP to n accumulators ACC(1)-ACC(n).

The switch circuit SW1, for example, as shown in FIG. 4, a crossbar switch or the like including "k×n" number of switches S(1, 1)-S(k, n). The switches S(1, 1)-S(k, n) are provided at intersections of k wirings LNd(1)-LNd(k) and n wirings LNa(1)-LNa(n), respectively. The k wirings LNd(1)-LNd(k) transfer k weighting factors W(1)-W(k) from the decompressor DCMP, respectively. The n wirings LNa(1)-LNa(n) are connected to the n accumulators ACC(1)-ACC(n), respectively.

The switch control circuit SWCT, in advance, for each value of the identifier ID1, a combination of on/off for the switch S(1, 1)-S(k, n) is set. The switch control circuit SWCT receives the identifier ID1 and controls on/off of switches S(1, 1)-S(k, n) by generating "k×n" switch control signals SS(1, 1)-SS(k, n) corresponding thereto, respectively. Although not shown, the switch circuit SW2 of FIG. 2, for example, is constituted by the same crossbar switch or the like as FIG. 4.

In FIG. 2, the DMA controller DMAC3 comprises n channels CH(1)-CH(n). Each of the n channels CH(1)-CH(n) reads the pixel values in the image data IMD from the memory MEM2 of FIG. 1 and transfers them to the n accumulators ACC(1)-ACC(n) on the basis of the individually set read address ranges.

Each of the n accumulators ACC(1)-ACC(n) has, for example, one multiplier and one cumulative adder. In addition, each of the n accumulators ACC(1)-ACC(n) may have, for example, a bias adder or an activation function calculator required in the processing of the neural network. The n accumulators ACC(1)-ACC(n) multiply, for each control cycle, the n pixel values from the DMA controller DMAC3 and the k uncompressed weighting factors W(1)-W(k) transferred from the switch circuit SW1.

Here, the correspondence between the n accumulators ACC(1)-ACC(n) and k (k<n) weighting factors W(1)-W(k) is determined by the switch circuit SW1. At this time, the switch circuit SW1 transfers at least one of the k weighting factors W(1)-W(k) in parallel to two or more of the n accumulators ACC(1)-ACC(n). Then, each of the n accumulators ACC(1)-ACC(n) accumulates and adds the multiplication result of the pixel value thus obtained and the weighting factor to the time series in a plurality of control cycles. As an example, for k=28, n may be about several 100 to 1000.

The DMA controller DMAC2 includes m channels CH(1)-CH(m). Each of the m channels CH(1)-CH(m) transfers the outputs of the n accumulators ACC(1)-ACC(n) to the write addresses of the memory, for example, the memory MEM2 of FIG. 1, for each control cycle based on the write addresses individually set.

A switch circuit SW2 is provided between the n accumulators ACC(1)-ACC(n) and the DMA controller DMAC2. The switch circuit SW2, the switch control signal SS2 from the switch control circuit SWCT, and thus based on the correspondence represented by the identifier ID2, and transfers the output of the n accumulators ACC(1)-ACC(n) to m channels CH(1)-CH(m) in the DMA controller DMAC2.

Specific Example of Neural Network Processing

Figure 5:
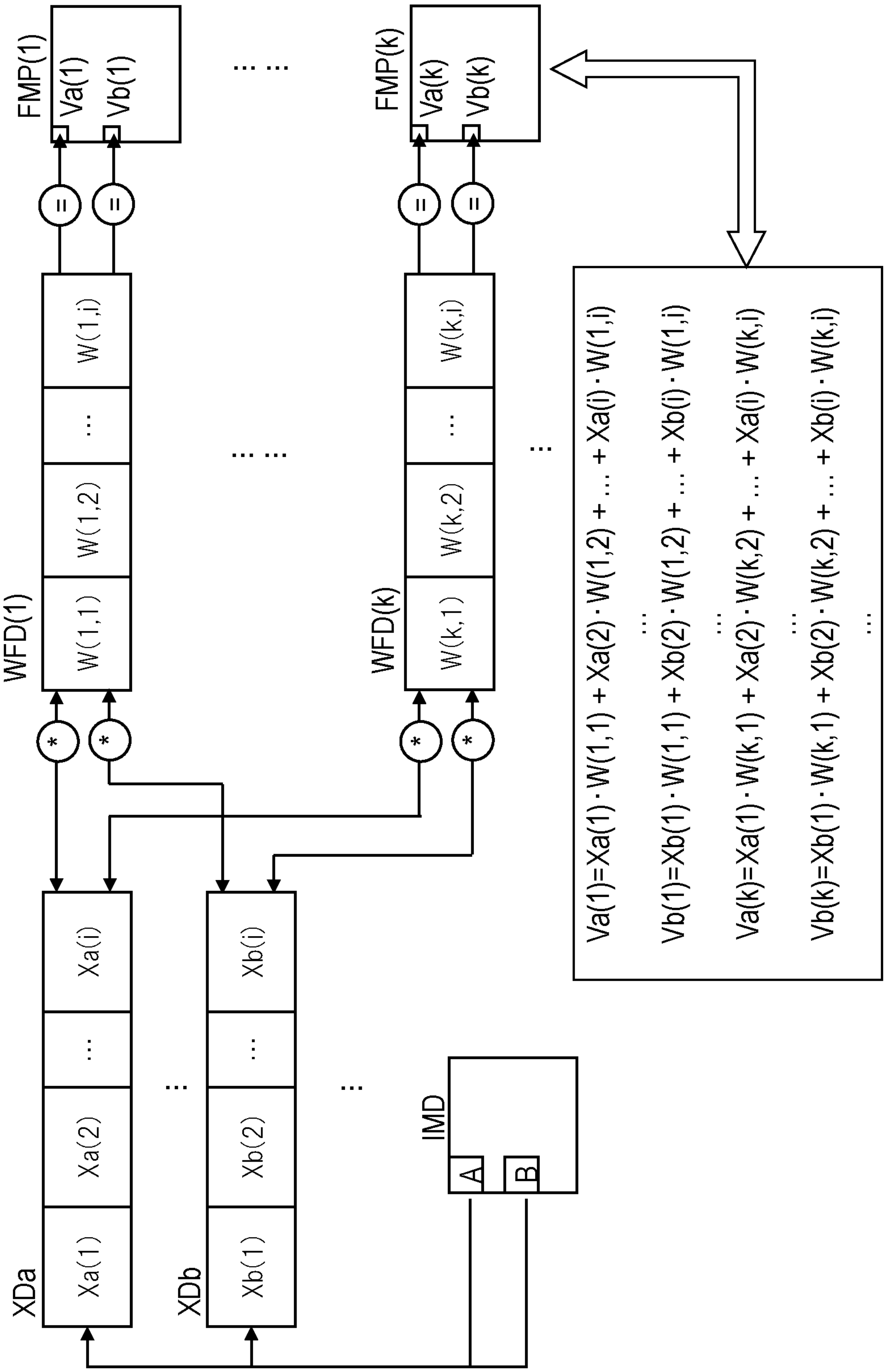
FIG. 5 is a schematic diagram showing an example of the processing contents in the convolution layer included in the CNN.

FIG. 5 is a schematic diagram showing an example of the processing contents in the convolution layer included in the CNN. In FIG. 5, a certain two dimensional region A in the image data IMD is composed of pixel value data XDa consisting of i pixel values Xa(1)-Xa(i). Similarly, another two dimensional region B in the image data IMD is composed of pixel value data XDb consisting of i pixel values Xb(1)-Xb(i).

On the other hand, in CNN, k weighting factor data WFD(1)-WFD(k), also called kernels, are used according to k output channels. The weighting factor data WFD(1) of the output channel (1) is composed of i weighting factors W(1, 1)-W(1, i). Similarly, the weighting factor data WFD(k) of the output channel (k) is also composed of i weighting factors W(k, 1)-W(k, i).

In the convolution layer, k feature maps FMP(1)-FMP(k) are generated according to k output channels. In the feature map FMP(1) of the output channel (1), the feature amount Va (1) of the pixel corresponding to the two dimensional region A in the image data IMD is calculated by the product-sum operation of the pixel value data XDa and the weighting factor data WFD(1) of the output channel (1). Similarly, in the feature map FMP(1), the feature amount Vb (1) of the pixel corresponding to the two dimensional region B in the image data IMD is calculated by the product-sum operation of the pixel value data XDb and the weighting factor data WFD(1) of the output channel (1).

Further, in the feature map FMP(k) of the output channel (k), the feature amount Va(k) of the pixel corresponding to the two-dimensional region A in the image data IMD is calculated by the product-sum operation of the pixel value data XDa and the weighting factor data WFD(k) of the output channel (k). Similarly, in the feature map FMP(k), the feature amount Vb (k) of the pixel corresponding to the two dimensional region B in the image data IMD is calculated by the product-sum operation of the pixel value data XDb and the weighting factor data WFD(k) of the output channel (k). Incidentally, each feature quantity, such a product-sum operation result, adding the bias value for each output channel, may be calculated further through the operation of the activation function.

Figure 6:
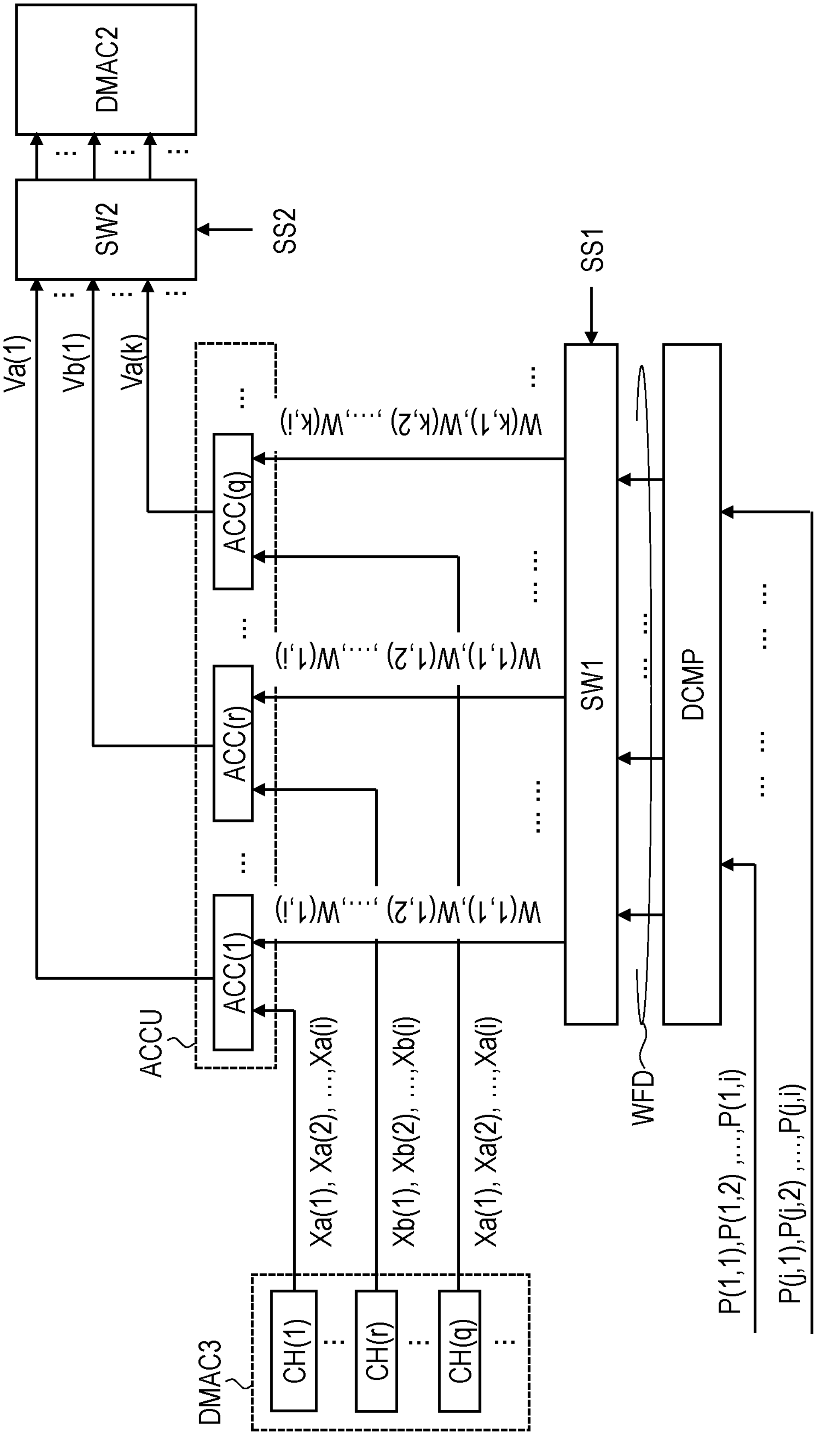
FIG. 6 is a schematic diagram showing an operation example when the neural network engine of FIG. 2 executes the processing of FIG. 5.

FIG. 6 is a schematic diagram showing an operation example when the neural network engine of FIG. 2 executes the processing of FIG. 5. In the example of FIG. 6, the accumulators ACC(1), . . . , ACC(r), . . . , ACC(q), . . . , calculate the feature quantities Va(1), . . . , Vb(1), . . . , Va(k), . . . , in FIG. 5, respectively.

In this case, the switch circuit SW1 transfers a plurality of accumulators ACC(1), . . . , in parallel to ACC(r), i weighting factors W(1, 1) to W(1, i) in the output channel (1) in order in i control cycles. Similarly, the switch circuit SW1 transfers i weighting factors W(k, 1) to W(k, i) in the output channel (k) in order in i control cycles in parallel for a plurality of accumulators ACC(q), . . . .

Prior to such processing, the decompressor DCMP also receives, for example, the compressed j weighting factors P(1, 1) to P(j, 1) in the first control cycle and outputs the weighting factors W(1, 1) to W(k, 1) for the k output channels by decompressing it. The header HD is added to this compressed weighting factors P(1, 1) to P(j, 1), as shown in FIG. 3. The switch control circuit SWCT generates a switch control signal SS1 based on the identifier ID1 in this header HD.

The switch circuit SW1 receives weighting factors W(1, 1)-W(k, 1) for k output channels from the decompressor DCMP, and transfers each of the weighting factors W(1, 1)-W(k, 1) in parallel to a plurality of accumulators based on the switch control signal SS1 from the switch control circuit SWCT. That is, for example, in FIG. 4, the switch control circuit SWCT generates a switch control signal SS1 to turn on a plurality of switches S(1, 1)-S(k, n) connected to the wiring LNd(1) for the weighting factor W(1).

On the other hand, in the DMA controller DMAC3, the channels CH(1) and CH(q) read the i pixel values Xa(1) to Xa(i) sequentially from the memory MEM2 and transfer them to the accumulators ACC(1) and ACC(q) in this order in i control cycles, respectively. In addition, the channel CH(r) sequentially reads the i pixel values Xb(1)-Xb(i) from the memory MEM2 and transfers them to the accumulator ACC(r) in this order in i control cycles. Thus, the accumulator ACC(1), . . . , ACC(r), . . . , ACC(q), . . . , the product-sum operation as shown in FIG. 5.

In each channel in the DMA controller DMAC2, the correspondence between the feature maps FMP(1)-FMP(k) corresponding to the output channels as illustrated in FIG. 5 and the write address for the memory, for example, the memory MEM2 of FIG. 1 is determined in advance. The switch circuit SW2, accumulators ACC(1), . . . , ACC(r), . . . , ACC(q), . . . the output of the switch control signal SS2 from the switch control circuit SWCT, and thus based on the identifier ID2, and transfers to the respective channels in the DMA controller DMAC2. Then, each channel in the DMA controller DMAC2 writes the output from the switch circuit SW2 to the write address of the preset memory.

Major Effect of the First Embodiment

Figure 7:
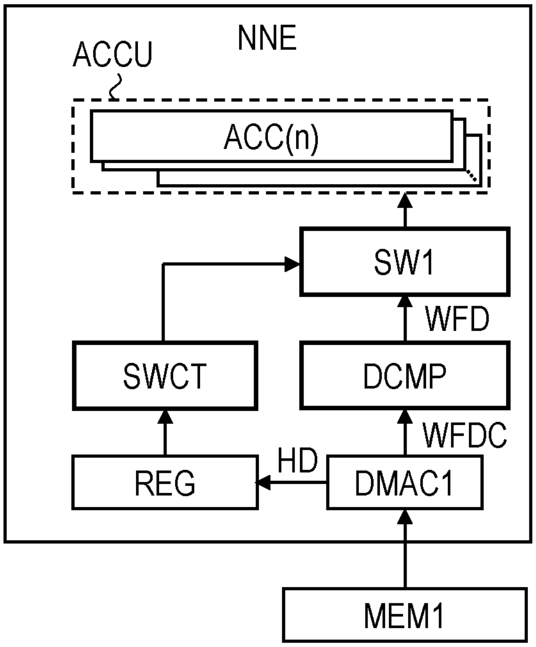
FIG. 7 is a schematic diagram showing a configuration example in which a part is extracted in semiconductor device of FIGS. 1 and 2.
Figure 11:
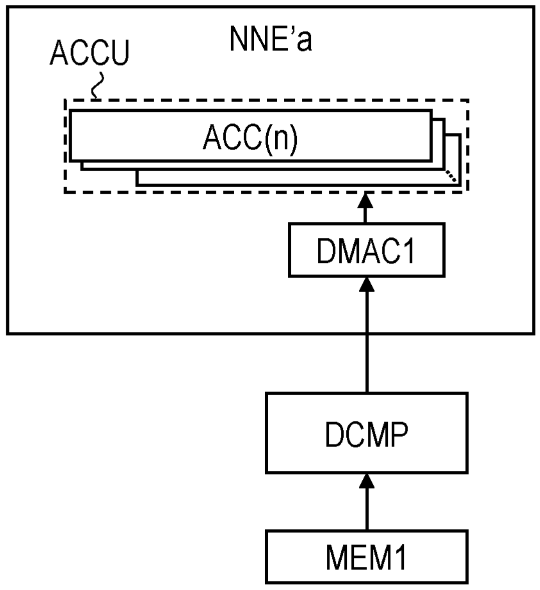
FIG. 11 is a schematic diagram showing a configuration example of a semiconductor device serving as a comparative example of the present invention.
Figure 12:
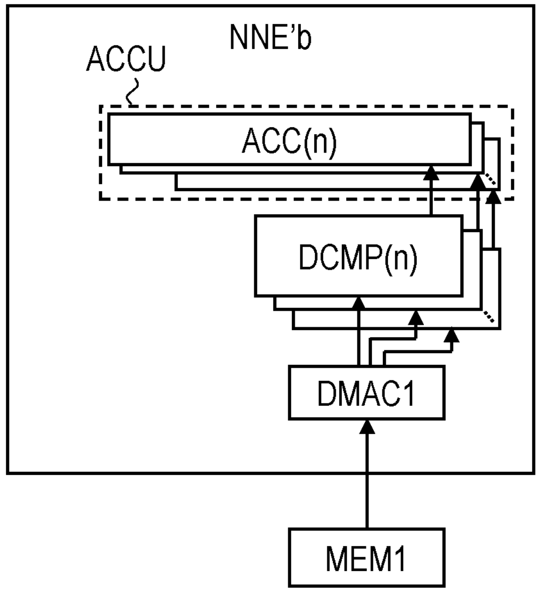
FIG. 12 is a schematic diagram showing a configuration example of a semiconductor device serving as a comparative example of the present invention.

FIG. 7 is a schematic diagram showing a configuration example in which a part is extracted in semiconductor device of FIGS. 1 and 2. FIG. 11 and FIG. 12 are schematic diagrams showing a configuration example of a semiconductor device serving as a comparative example of the present invention. In FIG. 7, a memory MEM1 and a DMA controller DMAC1, a decompressor DCMP, a switch circuit SW1, a register REG, a switch control circuit SWCT and an accumulator unit ACCU in the neural network engine NNE are shown.

On the other hand, the comparative example shown in FIG. 11 semiconductor device includes a neural network engine NNE'a including an accumulator unit ACCU and a DMA controller DMAC1, and a memory MEM1. A decompressor DCMP is then provided between the DMA controller DMAC1 and the memory MEM1.

In the configuration in FIG. 11, the control of the DMA controller DMAC1 may be complex because the numbers of data vary between the inputs and outputs of the decompressor DCMP. Therefore, it may not be possible to efficiently transfer the uncompressed weighting factor from the decompressor DCMP for n accumulators ACC(1)-ACC(n) in the accumulator unit ACCU. That is, there is a possibility that resources of n accumulators ACC(1)-ACC(n) can not be effectively utilized.

The comparative example shown in FIG. 12 includes a neural network engine NNE'b including n accumulators ACC(1)-ACC(n), n decompressing units DCMP(1)-DCMP(n) and a DMA controller DMAC1, and a memory MEM1. The decompressors DCMP(1)-DCMP(n) are provided between the DMA controller DMAC1 and the accumulator unit ACCU as in FIG. 7.

However, in the configuration example in FIG. 12, n decompressors DCMP(1)-DCMP(n) are provided to effectively utilize n accumulators ACC(1)-ACC(n). Then, each of the n decompressors DCMP(1)-DCMP(n) transferrers an uncompressed weighting factor to the n accumulators ACC (1)-ACC(n). However, in this instance, the circuit area may increase with n decompressor DCMP(1)-DCMP(n), and thus the power consumption may also increase.

On the other hand, the configuration example in FIG. 7, unlike the configuration example in FIG. 12, the switch circuit SW1 is provided between the accumulator unit ACCU and the decompressor DCMP. The switch circuit SW1, as shown in FIGS. 4 and 6 and the like, it is possible to transfer one weight factor from the decompressor DCMP to a plurality of accumulators. Consequently, in the configuration of FIG. 7, since it is sufficient to provide a single decompressor DCMP, it is possible to reduce the circuit area, thus, it is possible to reduce the power consumption.

Furthermore, comparing with the configuration example in FIG. 11, by appropriately defining the correspondence in the switch circuit SW1 by the identifier ID1 in the header HD of FIG. 3, the resource of n accumulators ACC(1)-ACC (n) can be effectively utilized. As a result, it becomes possible to speed up the processing of neural networks. Further, in another aspect, the identifier ID1 is appropriately determined in advance and stored in the memory MEM1 as the weighting factor data set WFDS of FIG. 3, so that it can be flexibly supported for neural networks of various configurations. This flexibility is equally effective for identifier ID2.

Second Embodiment

Configuration around Neural Network Engine

Figure 8:
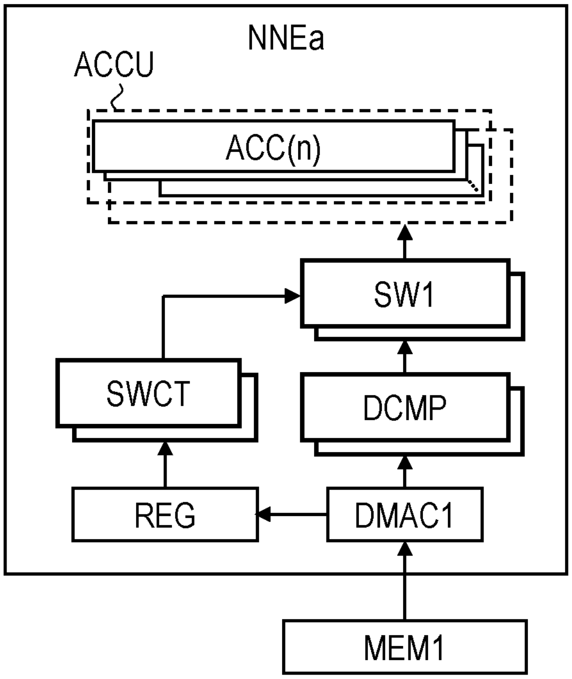
FIG. 8 is a schematic diagram showing a configuration example of a portion around a neural network engine in a semiconductor device in accordance with the inventive second embodiment.

FIG. 8 is a schematic diagram showing a configuration example of a portion around a neural network engine in a semiconductor device in accordance with the inventive second embodiment. The neural network engine NNEa shown in FIG. 8, unlike the configuration of FIG. 7 includes a plurality of sets of decompressor DCMP, switch circuit SW1, switch control circuit SWCT and accumulator unit ACCU.

In the configuration example in FIG. 7, as shown in FIG. 3, for example, one decompressor DCMP, the uncompressed weighting factors W(1)-W(k) to be up to 28 is outputted. Then, the weighting factors W(1)-W(k) are appropriately transferred to the accumulators ACC(1)-ACC(n), such as about several 100 to 1000 pieces in the accumulator unit ACCU through the switch circuit SW1. However, in the configuration example of FIG. 7, for example, when the number of output channels is greater than 28, it may be necessary to perform processing in time division.

Therefore, a plurality of sets of decompressor DCMP as shown in FIG. 8, the switch circuit SW1, by providing the switch control circuit SWCT and the accumulator unit ACCU, even when the number of output channels is large, it is possible to perform the processing of many output channels in parallel. As a result, it becomes possible to speed up the processing of neural networks. In this case, for example, the bit-width of the weighting factor data set WFDS of FIG. 3 may be expanded to a plurality of times, or a plurality of DMA controller DMAC1 may be provided.

Third Embodiment

Configuration around Neural Network Engine

Figure 9:
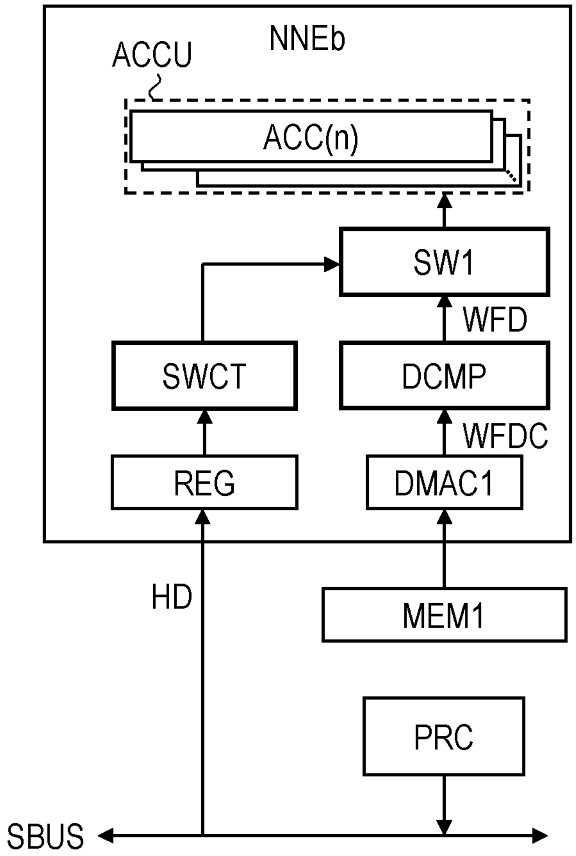
FIG. 9 is a schematic diagram showing a configuration example of a portion of a neural network engine in a semiconductor device in accordance with the inventive third embodiment.

FIG. 9 is a schematic diagram showing a configuration example of a portion of a neural network engine in a semiconductor device in accordance with the third embodiment of present invention. In the neural network engine NNEb shown in FIG. 9, the output path of the header HD from the DMA controller DMAC1 to the register REG is deleted as compared with the configuration example of FIG. 7. Instead, a header HD output path is formed from the processor PRC to the register REG.

That is, the processor PRC outputs an identifier ID1 to the register REG and thus the switch control circuitry SWCT via the system bus SBUS when the DMA controller DMAC1 transfers the compressed weighting factor data WFDC as shown in FIG. 3 to the decompressor DCMP. Specifically, the processor PRC generates the header HD of FIG. 3 at a timing corresponding to the processing of the neural network engine NNEb, and outputs the identifiers ID1 and ID2 included in the header HD to the switch control circuit SWCT. By using such a configuration, it is possible to reduce the storage capacity of the memory MEM1 required for the header HD.

Fourth Embodiment

Details of Neural Network Engine

Figure 10:
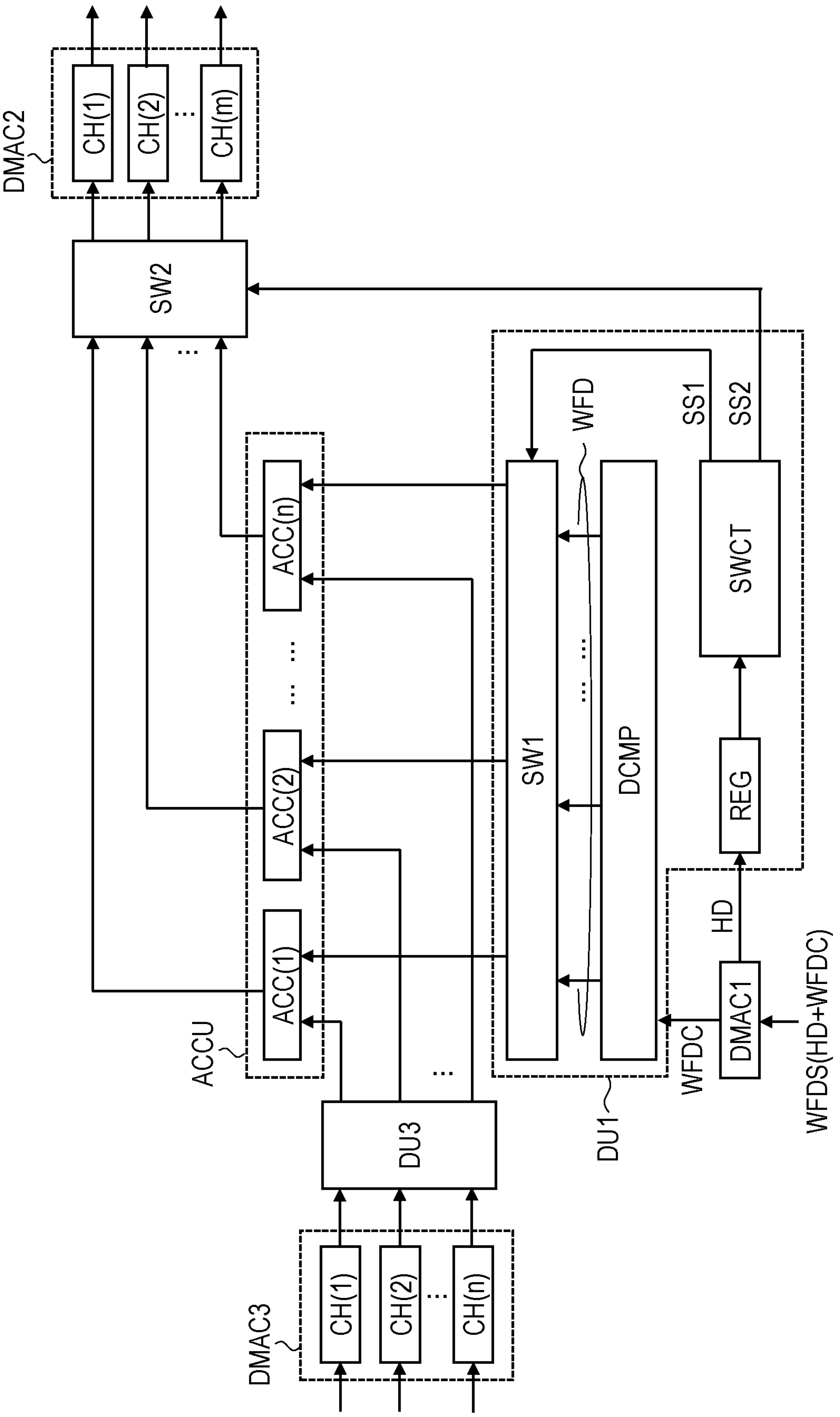
FIG. 10 is a diagram showing a detailed configuration of a neural network engine in a semiconductor device according to the present fourth embodiment.

FIG. 10 is a diagram showing a detailed configuration example of a neural network engine in a semiconductor device according to the present fourth embodiment. The neural network engine shown in FIG. 10 is provided with a decompressing unit DU3 between the DMA controller DMAC3 and the accumulator unit ACCU as compared to the configuration of FIG. 2.

The decompressing unit DU3, the switch control circuit SWCT associated with the processing of the weighting factor described above, the decompressor DCMP, the switch circuit SW1 and the register REG as the decompressing unit DU1 comprises the same configuration as the decompressing unit DU1. That is, the memory MEM1 holds the pre-compressed image data. Then, the decompressing unit DU3 transfers the compressed image data to the accumulator unit ACCU while expanding.

Normally, the image data IMD is used in a state stored in a memory MEM2 for caching as uncompressed data because the amount of data is smaller than the weighting factor data WFD. However, if, for example, the number of input channels of the image data IMD increases, it may be difficult to sufficiently secure the storage capacity associated with the image data IMD in the memory MEM2. Therefore, by using the configuration example as shown in FIG. 10, it is possible to correspond even when the data amount of the image data IMD is large.

Although the invention made by the present inventor has been specifically described based on the embodiment, the present invention is not limited to the embodiment described above, and it is needless to say that various modifications can be made without departing from the gist thereof.

What is claimed is:

1. A semiconductor device to execute neural networks comprising:

one or more memories for holding a plurality of pixel values, j compressed weighting factors, and a first identifier, wherein the j compressed weighting factors and the first identifier are stored together as a weighting factor data set in the one or more memories;

a single decompressor for restoring the j compressed weighting factors to k (k≥j) uncompressed weighting factors, wherein each of the j compressed weighting factors includes map data representing locations of non-zero coefficients, and wherein the single decompressor restores the j compressed weighting factors to the k uncompressed weighting factors based on the included map data and outputs all of the k uncompressed weighting factors in parallel during a single control cycle;

a first DMA (Direct Memory Access) controller for reading the weighting factor data set from the one or more memories and transferring the j compressed weighting factors of the weighting factor data set to the single decompressor and the first identifier of the weighting factor data set to a switch control circuit;

n (n>k) accumulators for multiplying the plurality of pixel values and the k uncompressed weighting factors, and for adding cumulatively the multiplication result to a time series; and a first switch circuit provided between the single decompressor and the n accumulators, for transferring, during the single control cycle and in parallel, all of the k uncompressed weighting factors output by the single decompressor to the n accumulators based on a first correspondence represented by the first identifier, wherein the first correspondence is defined by the switch control circuit based on the first identifier such that the first switch circuit is dynamically configured at runtime to optimize resource utilization of the n accumulators, wherein, during the single control cycle, the first switch circuit transfers at least one of the k uncompressed weighting factors output by the single decompressor in parallel to two or more of the n accumulators in accordance with the first correspondence.

2. The semiconductor device according to claim 1, further comprising the switch control circuit, wherein the memories hold the j compressed weighting factors as a weighting factor data set along with the first identifier, wherein the first DMA controller reads the weighting factor data set from the memories and transfers the j compressed weighting factors included in the weighting factor data set to the single decompressor, and wherein the switch control circuit controls the first correspondence in the first switch circuit based on the first identifier included in the weighting factor data set read by the first DMA controller.

3. The semiconductor device according to claim 1, wherein the first switch circuit transfers at least one of the k uncompressed weighting factors to two or more of the n accumulators.

4. The semiconductor device according to claim 1 further comprising:

a second DMA controller for transferring an output of the n accumulators to the memories; and a second switch circuit provided between the n accumulators and the second DMA controller for transferring the output of the n accumulators to a plurality of channels in the second DMA controller based on a second correspondence represented by a second identifier.

5. The semiconductor device according to claim 4, further comprising a switch control circuit, wherein the memories hold the j compressed weighting factors as a weighting factor data set along with the first identifier and the second identifier, wherein the first DMA controller reads the weighting factor data set from the memories and transfers the j compressed weighting factors included in the weighting factor data set to the single decompressor, and wherein the switch control circuit controls the first correspondence in the first switch circuit and the second correspondence in the second switch circuit respectively based on the first identifier and the second identifier included in the weighting factor data set read by the first DMA controller.

6. The semiconductor device according to claim 1, further comprising a third DMA controller for transferring the plurality of pixel values reads from the memories to the n accumulators.

7. A semiconductor device composed of a single chip comprising:

a neural network engine for executing neural network processing;

one or more memories for holding a plurality of pixel values, j compressed weighting factors, and a first identifier, wherein the j compressed weighting factors and the first identifier are stored together as a weighting factor data set in the one or more memories;

a processor; and a bus for connecting the neural network engine, the memories and the processor to each other, wherein the neural network engine further comprising, a single decompressor for restoring the j compressed weighting factors to k (k≥j) uncompressed weighting factors, wherein each of the j compressed weighting factors includes map data representing locations of non-zero coefficients and wherein the single decompressor restores the j compressed weighting factors to the k uncompressed weighting factors based on the map data included in the respective compressed weighting factors and outputs all of the k uncompressed weighting factors in parallel during a single control cycle;

a first DMA (Direct Memory Access) controller for reading the weighting factor data set from the one or more memories and transferring the j compressed weighting factors of the weighting factor data set to the single decompressor and the first identifier of the weighting factor data set to a switch control circuit;

n (n>k) accumulators for multiplying the plurality of pixel values and the k uncompressed weighting factors, and adding cumulatively the multiplication result to a time series;

a first switch circuit provided between the single decompressor and the n accumulators for transferring, during the single control cycle and in parallel, all of the k uncompressed weighting factors output by the single decompressor to the n accumulators, based on a first correspondence represented by the first identifier, wherein the first correspondence is defined by the switch control circuit based on the first identifier such that the first switch circuit is dynamically configured at runtime to optimize resource utilization of the n accumulators; and the switch control circuit for controlling the first correspondence in the first switch circuit based on the first identifier, wherein the switch control circuit generates a switch control signal based on the first identifier received from the first DMA controller, wherein, during the single control cycle, the first switch circuit transfers at least one of the k uncompressed weighting factors output by the single decompressor in parallel to two or more of the n accumulators by the first switch circuit in accordance with the first correspondence.

8. The semiconductor device according to claim 7, wherein the processor outputs the first identifier to the switch control circuit when the first DMA controller transfers the j compressed weighting factors to the single decompressor.

9. The semiconductor device according to claim 7, wherein the first switch circuit transfers at least one of the k uncompressed weighting factors to two or more of the n accumulators.

10. The semiconductor device according to claim 7, wherein the neural network engine further comprises:

a second DMA controller for transferring an output of the n accumulators to the memory; and a second switch circuit provided between the n accumulator and the second DMA controller for transferring the output of the n accumulators to the second DMA controller based on a second correspondence represented by a second identifier.

* * * * *